June 25, 1929.  C. E. OGDEN  1,718,663
METALLIC RECTIFIER CONSTRUCTION
Filed Feb. 17, 1928
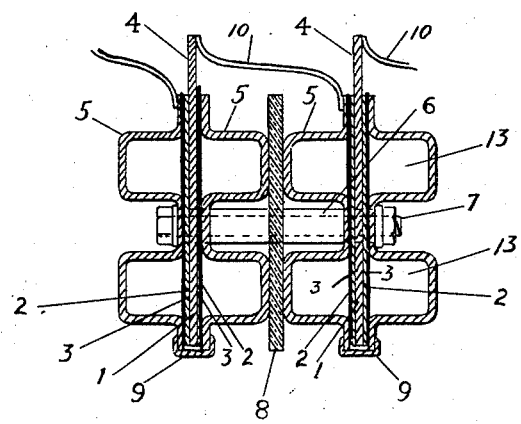
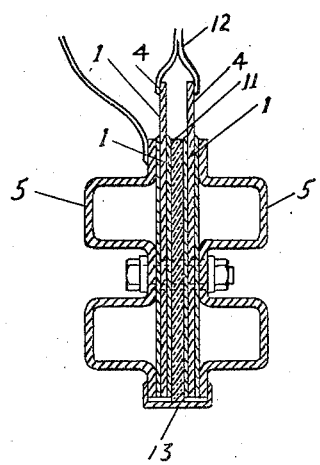 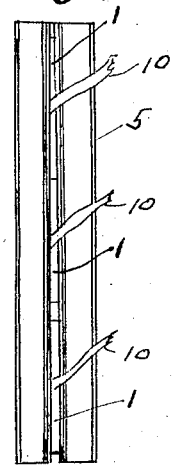
Inventor
Clarence E. Ogden,
By Arthur H. Ewald,
Attorney.

Patented June 25, 1929.

1,718,663

UNITED STATES PATENT OFFICE.

CLARENCE E. OGDEN, OF CINCINNATI, OHIO, ASSIGNOR TO THE KODEL RADIO CORPORATION, A CORPORATION OF OHIO.

METALLIC RECTIFIER CONSTRUCTION.

Application filed February 17, 1928. Serial No. 255,135.

The present invention relates to rectifier construction, particularly of the copper oxide type.

In electrical rectifiers of the type mentioned, there is a tendency for the plates to heat during operation, which increases the resistance and lowers the efficiency of the device. Particularly in rectifiers of high current capacity is this tendency detrimental to the continued operation of the rectifier, and it is to provide means whereby the rectifying plates may be kept cool during operation that this invention is principally directed.

Further objects of the invention will appear from the following detailed description thereof.

In the drawings:

Figure 1 is a sectional view of a rectifier construction in accordance with this invention, the rectifier plates being in series.

Figure 2 is a similar view showing parallel connections.

Figure 3 is an elevation illustrating a modified form of assembly.

The numeral 1 indicates the rectifier plates, which are preferably of the copper oxide type, and as such are provided by suitable processing with oxide layers 2—2, and reduced copper films 3—3, for contact purposes, in accordance with a construction now in wide use. Each of the plates 1 is provided with a terminal 4.

The numeral 5 indicates contact plates of tin, or other suitable conductive metal, the same being formed with substantially rectilinear corrugations as clearly shown in the drawings. The plates 5 are assembled in connection with the rectifying plates 1 as shown in the drawings, the plates 5 and 1 being provided with registering openings for an insulating bushing 6, which is arranged to extend through the assembly, and the parts are retained in position by means of a bolt 7. Ordinarily more than one rectifying plate 1 is required to complete a rectifier for commercial purposes, and the parts are then assembled with insulating plates 8, interposed between adjacent plates 5. The plates 5 in contact with opposite copper film terminals 3 of the plates 1, are electrically connected by straps or wires 9, and when more than one rectifying plate is employed the plates 5 of one assembly are electrically connected by means of wires or straps 10, with the terminal 4 on the next plate 1.

In Figure 2, rectifying plates 1 are assembled with an intervening insulating plate 11, and the terminals 4 are interconnected by means of a strap 12, the plates 5 in such construction being electrically connected by means of a strap 13. It will thus be seen that rectifying plates 1 are connected in parallel in this form of device, and it will be understood that any number of rectifying plates may be used either in series as shown in Figure 1, or parallel as shown in Figure 2, to serve the purpose and provide such electrical characteristics as may be desired or intended.

In Figure 3 I have shown two plates 1 assembled side by side upon the corrugated spacer plates 5, whereby a high current capacity is attained without the necessity of using impractically large rectifying plates 1.

From the foregoing description it will be seen that by means of the corrugated spacing plates 5, channels or flues 13 are provided around the rectifying plates which give freer air circulation and thus keep the plates cool during operation.

It will be understood that the modifications in the details of construction as in the shape of the spacing or corrugated plates may be made without departing from the scope of the present invention as defined in the appended claims.

Having thus fully described my invention, what I claim as new and desire to secure by Letters Patent is:

1. In a rectifier construction comprising in combination with a metallic rectifying plate, said rectifying plate having a layer of oxide formed thereon, and a film of reduced copper on said oxide, a corrugated plate assembled in contact with said film, and arranged to provide air channels adjacent said rectifying plate.

2. In a rectifier construction, in combination with a metallic rectifying plate, said rectifying plate having layers of oxide formed on opposite surfaces thereof, and films of reduced copper on said oxide, corrugated plates assembled in contact with said films, the corrugations of said last mentioned plates registering so as to form air channels substantially surrounding said rectifying plate.

3. In a rectifier construction, a pair of contact plates, said plates being provided with longitudinal corrugations, and rectifying plates arranged to be assembled laterally adjacent each other between said contact plates in such manner that the corrugations of said contact plates register so as to form air channels substantially surrounding said rectifying plates.

4. A rectifier construction comprising a plurality of rectifying plates, corrugated contact plates assembled on opposite sides of each of said rectifying plates so as to form air channels substantially surrounding said rectifying plates, means for assembling the respective rectifying plate and corrugated plate assemblies, and insulating plates interposed between adjacent corrugated plates.

CLARENCE E. OGDEN.